United States Patent
Bitton (10) Patent No.: US 9,491,029 B2
(45) Date of Patent: Nov. 8, 2016

(54) DEVICES AND METHODS FOR REDUCING SIGNAL DISTORTION IN I/Q MODULATION TRANSCEIVERS

(71) Applicant: APPLE INC., Cupertino, CA (US)

(72) Inventor: Guy Bitton, Zoran (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/570,787

(22) Filed: Dec. 15, 2014

(65) Prior Publication Data

US 2016/0173317 A1 Jun. 16, 2016

(51) Int. Cl.
*H04B 1/04* (2006.01)
*H04L 27/38* (2006.01)
*H04L 27/36* (2006.01)

(52) U.S. Cl.
CPC ......... *H04L 27/3863* (2013.01); *H04L 27/364* (2013.01)

(58) Field of Classification Search
CPC ..................................................... H04L 27/364
USPC ....................... 455/86, 114.2, 226.1; 375/219
See application file for complete search history.

(56) References Cited

U.S. PATENT DOCUMENTS

| | | | | |
|---|---|---|---|---|
| 5,323,391 A | * | 6/1994 | Harrison | H04J 4/005 370/210 |
| 5,444,865 A | * | 8/1995 | Heck | H04B 1/54 455/78 |
| 6,917,815 B2 | | 7/2005 | Hajimiri et al. | |
| 7,818,028 B2 | | 10/2010 | Vassiliou et al. | |
| 8,358,997 B2 | | 1/2013 | Mo et al. | |
| 2004/0246048 A1 | * | 12/2004 | Leyonhjelm | H03F 1/3247 330/2 |
| 2004/0259518 A1 | | 12/2004 | Aktas et al. | |
| 2010/0118924 A1 | | 5/2010 | Pal | |
| 2011/0312292 A1 | * | 12/2011 | Mo | H04B 1/30 455/226.1 |
| 2012/0250750 A1 | * | 10/2012 | Mishra | H04L 27/0014 375/226 |

\* cited by examiner

*Primary Examiner* — Hsin-Chun Liao
(74) *Attorney, Agent, or Firm* — Fletcher Yoder PC (57) ABSTRACT

Devices and methods for reducing or substantially eliminating I/Q mismatch and/or LO leakage in I/Q transceivers are provided. By way of example, an electronic device includes a transceiver configured to receive an in-phase/quadrature (I/Q) signal, and to generate an electromagnetic signal based on the I/Q signal. However, the electromagnetic signal may also include a distortion. Accordingly, the transceiver is also configured to receive a feedback signal based on the electromagnetic signal, measure an energy of the distortion by way of the feedback signal, and to generate one or more correction factors based at least in part on the energy of the distortion. The one or more correction factors may be utilized to reduce or substantially eliminate the distortion of the electromagnetic signal.

18 Claims, 5 Drawing Sheets

DEVICES AND METHODS FOR REDUCING SIGNAL DISTORTION IN I/Q MODULATION TRANSCEIVERS

BACKGROUND

The present disclosure relates generally to Cartesian transmitters, and more particularly, to Cartesian transmitters included within electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers, or when coupled together as part of a single unit, transceivers, are commonly included in various electronic devices, and particularly, portable electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. Certain types of transceivers, known as wireless transceivers, may be used to generate and receive wireless signals to be transmitted and/or received by way of an antenna coupled to the transceiver. Specifically, the wireless transceiver is generally used to wirelessly communicate data over a network channel or other medium (e.g., air) to and from one or more external wireless devices.

The wireless transceivers may generally include subcomponents such as, for example, oscillators, modulators, one or more filters, and a power amplifier. Furthermore, certain data modulation techniques that may be implemented by wireless transceivers may include a modulation of in-phase (I)/ quadrature (Q) time samples of a signal. Specifically, Cartesian transceivers, or I/Q transceivers, may be employed in many wireless applications due to their ease-of-use in the modulation of data carrier signals. However, because I/Q transceivers may also utilize phase information to modulate the data and carrier frequency signal of one or more oscillators included in the I/Q transceivers, I/Q transceivers may be susceptible to amplitude and phase mismatch (e.g., I/Q mismatch) and oscillator phase and/or frequency leakage (e.g., local oscillator (LO) leakage). If left to persist, these I/Q mismatch (IQMM) and/or LO leakage components may contribute to the distortion of the modulated carrier signal of the I/Q transceivers, and, by extension, may distort the information (e.g., data bits) to be transmitted. It may be useful to provide more advanced and improved I/Q transceivers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in reducing or substantially eliminating I/Q mismatch and/or LO leakage in I/Q transceivers. By way of example, an electronic device includes a transceiver configured to receive an in-phase/quadrature (I/Q) signal, and to generate an electromagnetic signal based on the I/Q signal. However, the electromagnetic signal may also include a distortion. Accordingly, the transceiver is also configured to receive a feedback signal based on the electromagnetic signal, measure an energy of the distortion by way of the feedback signal, and to generate one or more correction factors based at least in part on the energy of the distortion. The one or more correction factors may be utilized to reduce or substantially eliminate the distortion of the electromagnetic signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to in-phase/quadrature (I/Q) transceivers and methods for reducing or substantially eliminating I/Q mismatch (IQMM) and/or local oscillator (LO) leakage in I/Q transceivers for wireless local area networks (WLANs) and/or other wireless networks. In certain embodiments, an I/Q transceiver (e.g., along the receiver path of the transceiver) may measure an energy component of a zero intermediate frequency (ZIF) signal representing one or more IQMM and/or LO leakage components that may be present in the radio frequency (RF) to be transmitted by the transmitter of the I/Q transceiver. Specifically, the transceiver may be used to sample and derive an energy of the coefficients (e.g., Fourier coefficients) of a feedback signal as an indication of the IQMM and/or LO leakage components that may be included in the RF signal, and may then generate one or more correction factors (e.g., Fourier coefficients) to compensate for the IQMM and/or LO leakage components based on the energy of the IQMM and/or LO leakage components detected in the ZIF feedback signal. In this way, by constantly and/or iteratively measuring the energy of the IQMM and/or LO leakage components at a ZIF frequency, the present techniques may reduce or substantially eliminate IQMM and/or LO leakage components that may otherwise become apparent in the RF transmission signal.

Figure 1:
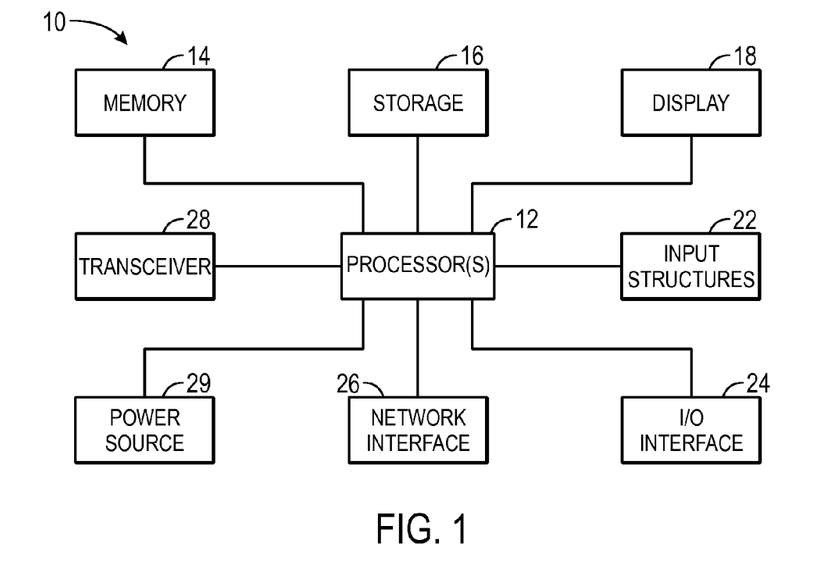
FIG. 1 is a schematic block diagram of an electronic device including a transceiver, in accordance with an embodiment.

With the foregoing in mind, a general description of suitable electronic devices that may employ I/Q transmitters and are useful in reducing or substantially eliminating I/Q mismatch (IQMM) and local oscillator (LO) leakage in I/Q transmitters will be provided below. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24, network interfaces 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
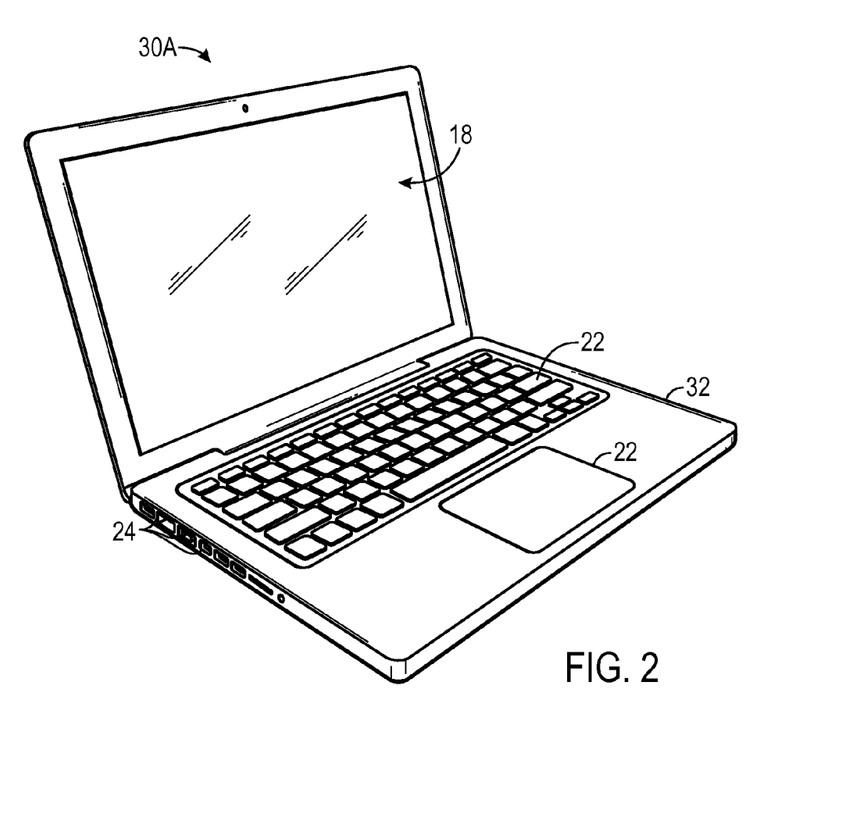
FIG. 2 is a perspective view of a notebook computer representing an embodiment of the electronic device of FIG. 1.
Figure 3:
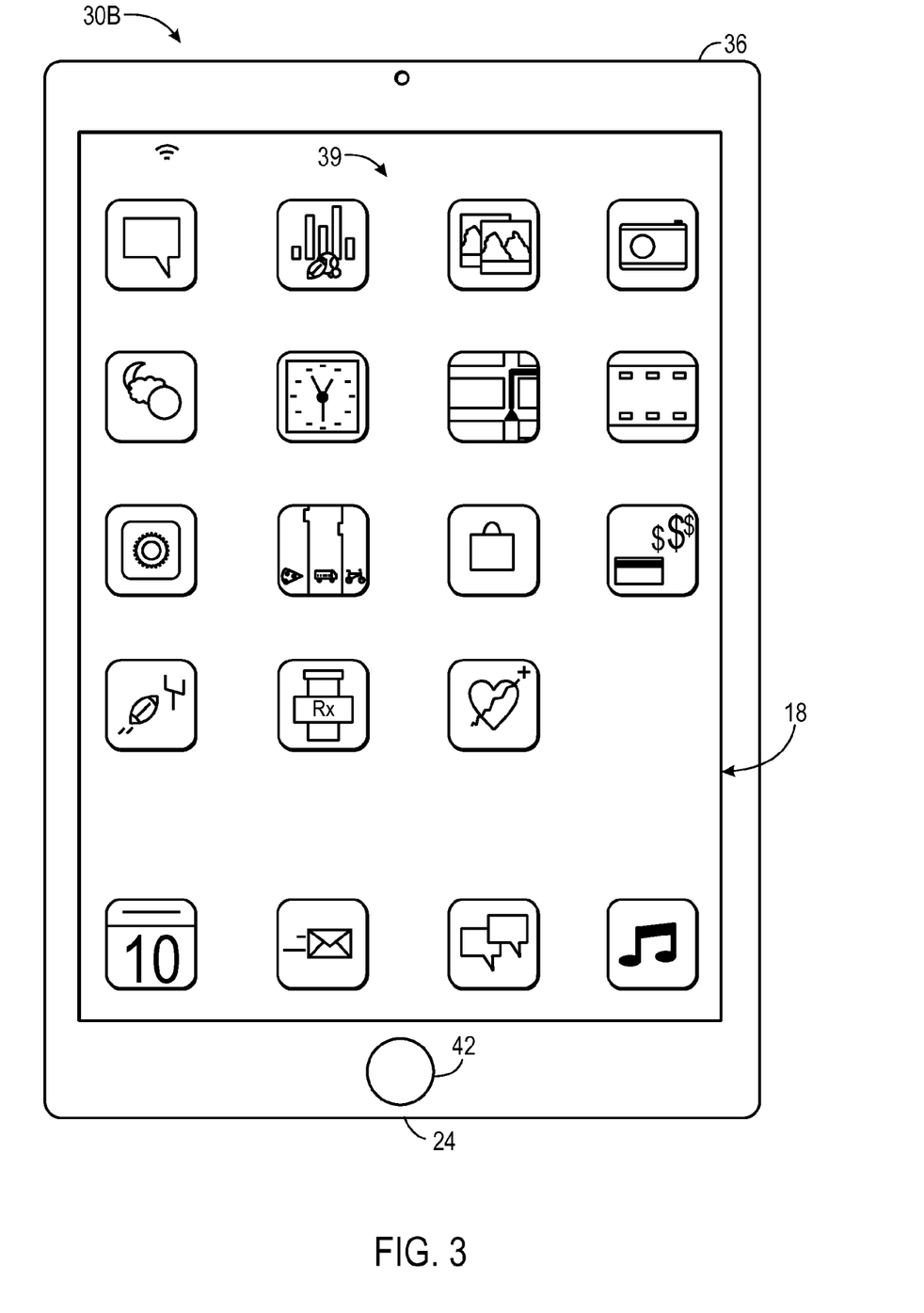
FIG. 3 is a front view of a hand-held device representing another embodiment of the electronic device of FIG. 1.
Figure 4:
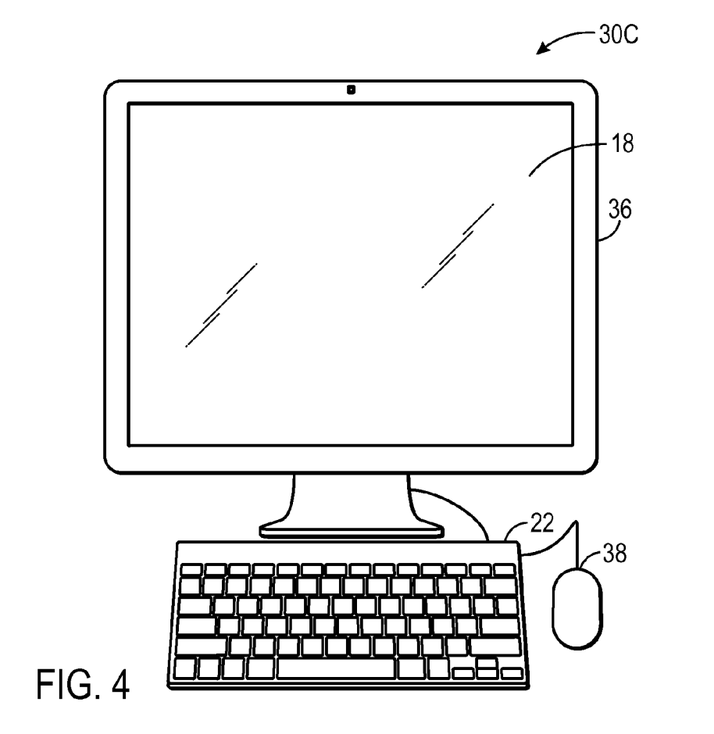
FIG. 4 is a front view of a desktop computer representing another embodiment of the electronic device of FIG. 1.
Figure 5:
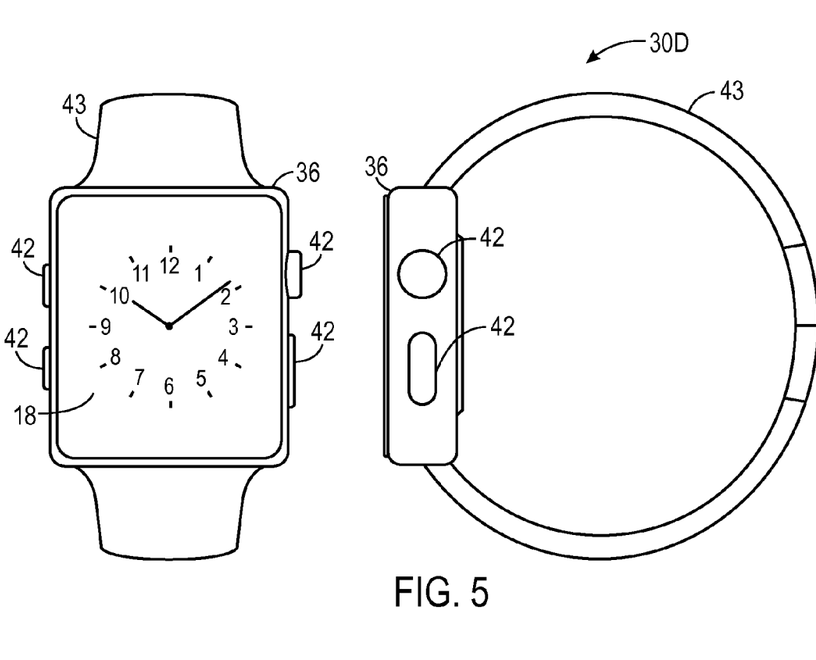
FIG. 5 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the desktop computer depicted in FIG. 4, the wearable electronic device depicted in FIG. 5, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, as noted above, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a tablet-sized embodiment of the electronic device 10, which may be, for example, a model of an iPad® available from Apple Inc of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 42, in combination with the display 18, may allow a user to control the handheld device 30B. For example, the input structure 40 may activate or deactivate the handheld device 30B, the input structure 42 may navigate user interface to a home screen, a user-configurable application screen, and/or activate a voice-recognition feature of the handheld device 30B, the input structures 42 may provide volume control, or may toggle between vibrate and ring modes. The input structures 42 may also include a microphone may obtain a user's voice for various voice-related features, and a speaker may enable audio playback and/or certain phone capabilities. The input structures 42 may also include a headphone input may provide a connection to external speakers and/or headphones.

Turning to FIG. 4, a computer 30C may represent another embodiment of the electronic device 10 of FIG. 1. The computer 30C may be any computer, such as a desktop computer, a server, or a notebook computer, but may also be a standalone media player or video gaming machine. By way of example, the computer 30C may be an iMac®, a MacBook®, or other similar device by Apple Inc. It should be noted that the computer 30C may also represent a personal computer (PC) by another manufacturer. A similar enclosure 36 may be provided to protect and enclose internal components of the computer 30C such as the dual-layer display 18. In certain embodiments, a user of the computer 30C may interact with the computer 30C using various peripheral input devices, such as the keyboard 22 or mouse 38, which may connect to the computer 30C via a wired and/or wireless I/O interface 24.

Similarly, FIG. 5 depicts a wearable electronic device 30D representing another embodiment of the electronic device 10 of FIG. 1 that may be configured to operate using the techniques described herein. By way of example, the wearable electronic device 30D, which may include a wristband 43, may be an Apple Watch® by Apple, Inc. However, in other embodiments, the wearable electronic device 30D may include any wearable electronic device such as, for example, a wearable exercise monitoring device (e.g., pedometer, accelerometer, heart rate monitor), or other device by another manufacturer. The display 18 of the wearable electronic device 30D may include a touch screen (e.g., LCD, OLED display, active-matrix organic light emitting diode (AMOLED) display, and so forth), which may allow users to interact with a user interface of the wearable electronic device 30D.

In certain embodiments, as previously noted above, each embodiment (e.g., notebook computer 30A, handheld device 30B, computer 30C, and wearable electronic device 30D) of the electronic device 10 may include a transceiver 28, which may include an in-phase/quadrature (I/Q) transceiver (e.g., WLAN I/Q transceiver). Indeed, as will be further appreciated, the I/Q transceiver may include a transmitter path and receiver path, and may be used to reduce or substantially eliminate IQMM and/or LO leakage components that may otherwise become apparent in an RF transmission signal of the transceiver.

Figure 6:
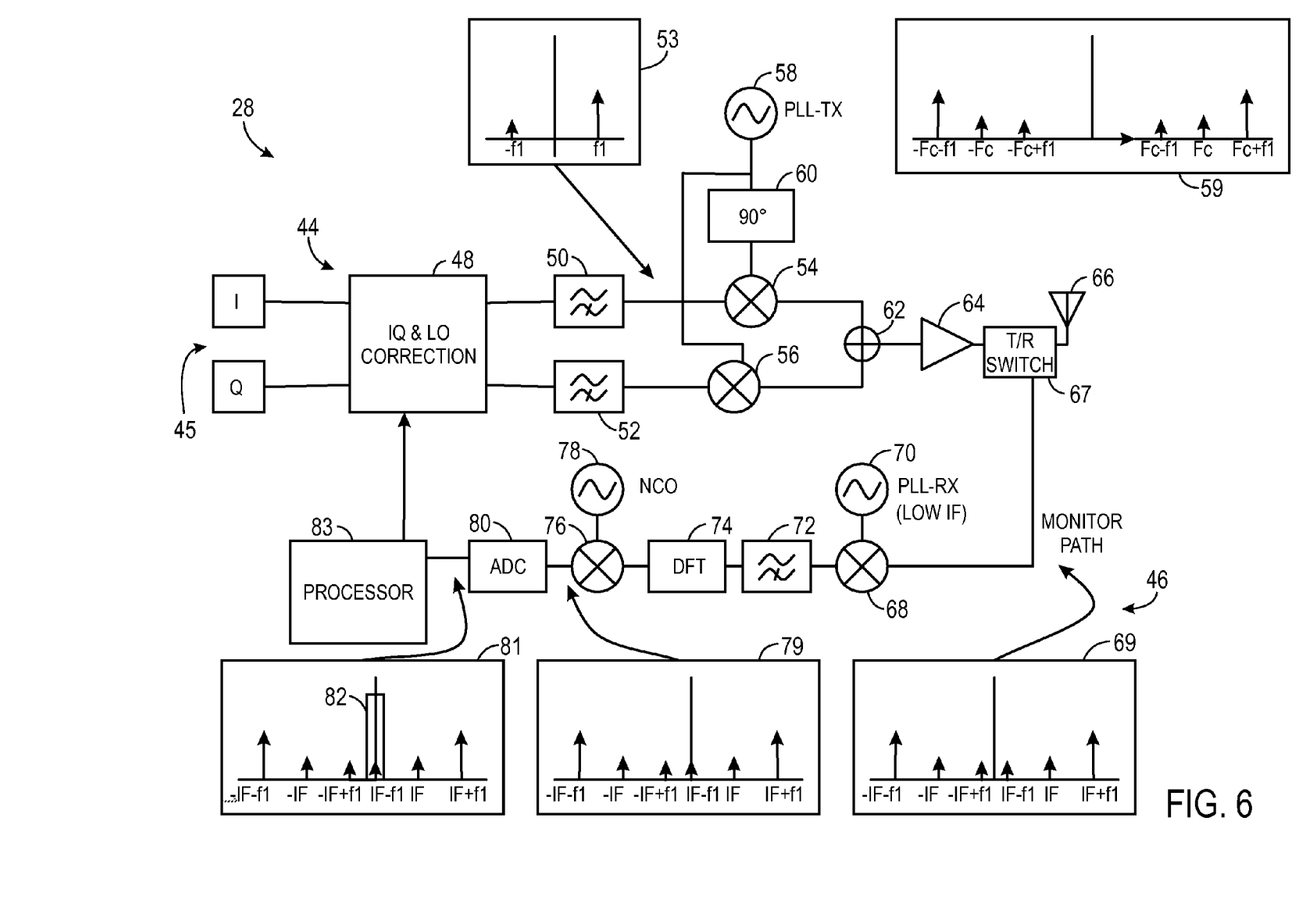
FIG. 6 is a schematic diagram of the transceiver included within the electronic device of FIG. 1, in accordance with an embodiment.

With the foregoing in mind, FIG. 6 depicts a schematic diagram of the transceiver 28. As illustrated, the transceiver 28 may include a transmitter 44 (e.g., transmitter path) and a receiver 46 (e.g., receiver path) coupled as part of a single unit. As depicted, the transmitter 44 may receive a signal 45 that may be initially modulated via an I/Q and LO correction block 48 (e.g., digital baseband). In certain embodiments, the transmitter 44 may receive a Cartesian coordinate represented signal 45, which may include, for example, data symbols encoded according to orthogonal I/Q vectors. Thus, when an I/Q signal is converted into an electromagnetic wave (e.g., radio frequency (RF) signal, microwave signal, millimeter wave signal), the conversion is generally linear as the I/Q may be frequency band-limited. The I/Q signals 45 may be then respectively passed to high pass filters (HPFs) 50 and 52, which may be provided to pass the high frequency components of the I/Q signals 45 and filter the low frequency components (e.g., as illustrated by frequency spectral screenshot 53). As further illustrated, the I/Q signals 45 may be then respectively passed to mixers 54 and 56, which may be used to mix (e.g., multiply or upconvert) the in-phase (I) component and the quadrature (Q) component of the I/Q signals 45.

In certain embodiments, as further illustrated in FIG. 6, a transmitter phase lock loop (PLL-TX) or oscillator 58 may be provided to generate 90° out of phase oscillation signals by which to mix the orthogonal in-phase (I) component and the quadrature (Q) component to generate a carrier frequency and/or radio frequency (RF) signal. The in-phase (I) component and the quadrature (Q) component signals may be then recombined (e.g., summed as illustrated by frequency spectral screenshot 59) via a summer 62, and then passed to a power amplifier (PA) 64 to amplify the summed signal, and to generate an electromagnetic signal (e.g., RF signal, microwave signal, millimeter wave signal) to be provided to an antenna 66 (e.g., dipole antenna, patch antenna, and so forth) for transmission. In some embodiments, the antenna 66 may be included on the same integrated chip as the transceiver 28 architecture. However, in other embodiments, the antenna 66 may be fabricated as part of a separate chip and/or circuitry that may be coupled to the other circuitry components (e.g., amplifier 64) of the transceiver 28.

In certain embodiments, as previously noted, the transmitter 44 may be coupled together with the receiver 46. Thus, as illustrated, the transceiver 28 may further include a transmitter/receiver (T/R) switch 67 or other circulator device, which may be useful in routing signals to be transmitted to the antenna 66 and routing signals received via the antenna 66 to the receiver 46 (e.g., receiver path). However, as will be further appreciated, in addition to merely downconverting and processing a received electromagnetic signal (e.g., RF signal, microwave signal, millimeter wave signal) to recover information from the received signal, the receiver 46 (e.g., receiver path of the transceiver 28) may include certain processing components that may be useful in providing a feedback path to reduce or substantially eliminate I/Q mismatch (IQMM) and/or LO leakage that may become apparent on the RF transmission signal (e.g., 2.4-5.8 gigahertz (GHz) signal at the output of the amplifier 64) to be transmitted, and, by extension, may distort the information (e.g., data bits) of the RF transmission signal.

For example, in certain embodiments, the receiver 46 may receive the RF signal (e.g., continuous-time or analog RF signal at the output of the amplifier 64) by utilizing a different frequency as a feedback signal (e.g., including the IQMM and/or LO leakage components), so as to not interfere with an otherwise normally received data signal via the antenna 66. For example, as illustrated in FIG. 6, a feedback signal (e.g., as depicted by the frequency spectral screenshot 69) may be received by the receiver 46. The feedback signal may be then passed to a mixer 68 (e.g., downconverter) to mix (e.g., multiply) the feedback signal with an IF signal (e.g., 10-20 megahertz (MHz) signal) provided by a receiver phase lock loop (PLL-RX) or oscillator 70.

In certain embodiments, the received feedback signal (e.g., monitored signal including IQMM and/or LO leakage) may be then passed through a high pass filter (HPF) 72 to a discrete Fourier transform (DFT) computational block 74. Although labeled a DFT computational block 74, it should be appreciated that the DFT computational block 74 may include any software system, hardware system, or some combination of software and hardware (e.g., one or more digital signal processors (DSPs)) that may be used to perform one or more fast Fourier transforms (FFTs) and/or inverse fast Fourier transforms (IFFTs) to compute one or more discrete Fourier transforms (DFTs) and/or inverse discrete Fourier transforms (IDFTs) to obtain (e.g., sample) an energy of the coefficients (e.g., Fourier coefficients) of the feedback signal. The energy of the coefficients of the feedback signal may include an indication of the IQMM and/or LO leakage components that may be included in the feedback signal, and, by extension, the IQMM and/or LO leakage components that may be included in the RF transmission signal (e.g., at the output of the amplifier 64). Specifically, in certain embodiments, the energy of the coefficients (e.g., Fourier coefficients) of the DFT of the IF feedback signal may represent an image energy of the IQMM and/or LO leakage components that may be included in the RF transmission signal.

In certain embodiments, as further illustrated in FIG. 6, the IF feedback signal may be then passed to a mixer 76 that may be used to mix (e.g., downconvert a second time) the IF feedback signal with a zero intermediate frequency (ZIF) signal (e.g., a discrete-time frequency signal) generated by a numerically controlled oscillator (NCO) 78. The NCO 78 may include any oscillator device that may be useful in generating a discrete-time and/or frequency domain (e.g., digital domain) representation of a carrier frequency signal as illustrated, for example, by the frequency spectral screenshot 79. The ZIF feedback signal may be then passed to an analog to digital converter (ADC) 80, which may be used to convert the digital ZIF feedback signal including the energy 82 (e.g., spectral energy, spectral regrowth and/or spectral mask) of the IQMM and/or LO leakage components (e.g., as illustrated by frequency spectral screenshot 81) to an analog signal to be controlled and/or adjusted in the time domain by a control processor 83. In some embodiments, the energy 82 may include a spurious energy (e.g., spectral regrowth and/or spectral mask) that may appear at or near the fundamental frequency component and/or harmonic frequency components of the carrier and/or RF frequency signal as illustrated by frequency spectral screenshot 81. Thus, the control processor 83 may generate one or more correction factors (e.g., DFT coefficients) to compensate for the IQMM and/or LO leakage components based on the energy 82 (e.g., spectral energy) of the IQMM and/or LO leakage components detected in the ZIF feedback signal.

Thus, as I/Q signals are received by the correction block 48, one or more correction factors may be applied to the respective in-phase I component and quadrature Q component signals, and may thus reduce or substantially prevent a possible occurrence of IQMM and/or LO leakage components from becoming apparent in the RF transmission signal (e.g., at the output of the amplifier 64) to be transmitted, and, by extension, may prevent the distortion of the information (e.g., data bits) carried by the RF transmission signal. Indeed, by constantly and iteratively measuring the energy (e.g., energy 82) of the IQMM and/or LO leakage components that may be included in the RF transmission signal at a ZIF frequency, the present techniques may reduce or substantially eliminate IQMM and/or LO leakage components utilizing the receiver 46 path of the transceiver 28. However, although the present IQMM and/or LO leakage detection and correction techniques may be performed utilizing one or more processors along the receiver 46 path, it should be appreciated that the present IQMM and/or LO leakage detection and correction techniques may be performed independently of the traditional external signal receiving processing performed by the receiver 46 and independently of any performance capabilities or limitations of the receiver 46, as the present IQMM and/or LO leakage detection and correction techniques are performed at a distinct frequency (e.g., ZIF frequency).

Figure 7:
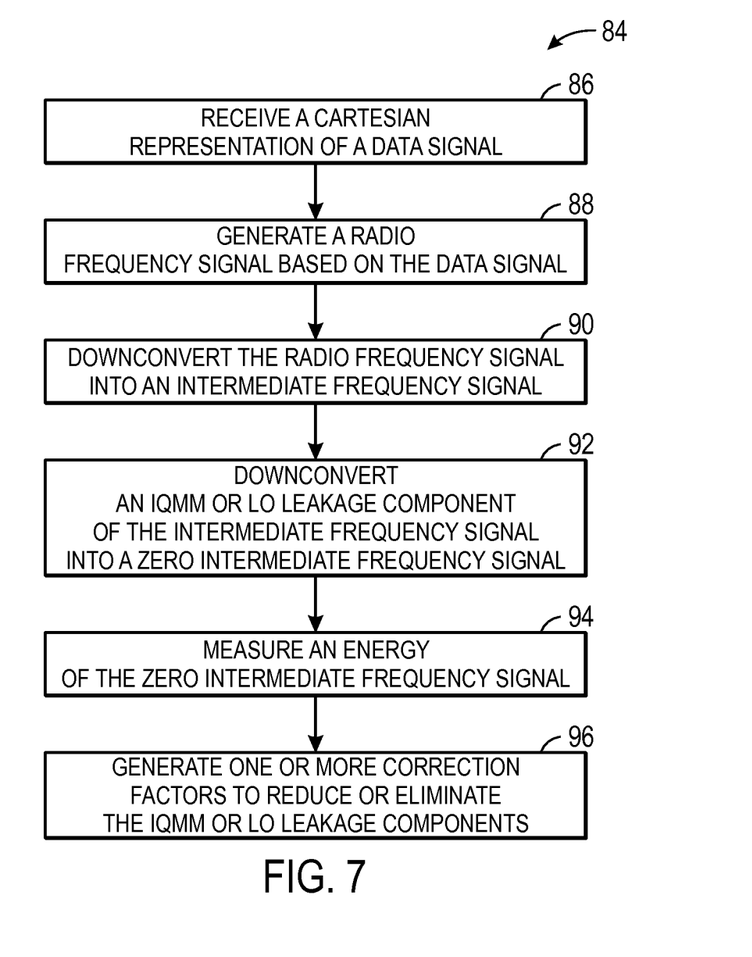
FIG. 7 is a flow diagram illustrating an embodiment of a process useful in reducing or substantially eliminating I/Q mismatch and LO leakage in I/Q transceivers, in accordance with an embodiment.

Turning now to FIG. 7, a flow diagram is presented, illustrating an embodiment of a process 84 useful in reducing or substantially eliminating I/Q mismatch (IQMM) and/or LO leakage in I/Q transceivers by using, for example, one or more processors that may be included within the transceiver 28 and/or the processor(s) 12 depicted in FIG. 1. The process 84 may include code or instructions stored in a non-transitory machine-readable medium (e.g., the memory 14) and executed, for example, by the one or more processor(s) 12 and/or transceiver 28 included within the system 10 and illustrated in FIG. 1. The process 84 may begin with the transceiver 28 receiving (block 86) a Cartesian representation of a data signal. For example, the transceiver 28 may receive a Cartesian coordinate represented signal 45, which may include, for example, data symbols encoded according to orthogonal I/Q vectors.

The process 84 may continue with the transceiver 28 generating (block 88) a radio frequency (RF) signal based on the I/Q data signal. For example, as previously discussed above with respect to FIG. 6, the transceiver 28 may mix (e.g., multiply) the orthogonal in-phase (I) component and the quadrature (Q) component by a approximately 90° out of phase oscillation signals to generate a carrier frequency, and ultimately an RF transmission signal (e.g., 2.4-5.8 GHz signal). The process 84 may then continue with the transceiver 28 downconverting (block 90) the radio frequency (RF) signal into an intermediate frequency (IF) signal. For example, as noted above, the receiver 46 (e.g., receiver path of the transceiver 28) may receive the RF signal (e.g., analog RF signal at the output of the amplifier 64) and downconvert the feedback signal into an IF signal (e.g., 10-20 MHz signal) generated by the PLL-RX oscillator 70.

The process 84 may then continue with the transceiver 28 downconverting (block 92) an IQMM and/or LO leakage component of the intermediate frequency (IF) into a zero intermediate frequency (ZIF) signal. For example, as again discussed above with respect to FIG. 6, the IF feedback signal received along the receiver 46 path of the transceiver 28 may be downconverted a second time to a ZIF signal (e.g., a discrete-time signal) generated by the NCO 78 to obtain, for example, an image of the energy of an IQMM and/or LO leakage component that may be present. The process 84 may then continue with the transceiver 28 measuring (block 94) an energy component of the zero intermediate frequency (ZIF) signal and/or the IF signal. Specifically, as previously noted, one or more processors of the transceiver 28 may be used to sample and derive an energy of the coefficients (e.g., Fourier coefficients) of the ZIF and/or IF feedback signal as an indication of the IQMM and/or LO leakage components that may be included in the ZIF and/or IF feedback signal, and, by extension, the IQMM and/or LO leakage components that may be included in the RF transmission signal (e.g., at the output of the amplifier 64).

The process 84 may then conclude with the transceiver 28 generating (block 96) one or more correction factors to reduce or substantially eliminate the IQMM and/or LO leakage. For example, the transceiver 28 may generate one or more correction factors (e.g., DFT coefficients) to compensate for the IQMM and/or LO leakage components based on the energy 82 (e.g., spectral energy) of the IQMM and/or LO leakage components detected in the ZIF feedback signal and/or IF feedback signal. In this way, by constantly and iteratively measuring the energy (e.g., energy 82) of the IQMM and/or LO leakage components at a ZIF frequency, the present techniques may reduce or substantially eliminate IQMM and/or LO leakage components that may otherwise become apparent in the RF transmission signal (e.g., at the output of the amplifier 64).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
 a transceiver configured to:
  receive an in-phase/quadrature (I/Q) signal;
  generate an electromagnetic signal based on the I/Q signal;
  receive a feedback signal based on the electromagnetic signal;
  downconvert the feedback signal into a zero intermediate frequency (ZIF) signal prior to measuring a spectral energy, wherein the transceiver comprises a numerically controlled oscillator (NCO) configured to generate the ZIF signal in a frequency domain;
  measure the spectral energy of an I/Q mismatch (IQMM) component or a local oscillator (LO) leakage component in a frequency domain by way of the feedback signal; and
  generate one or more correction factors based at least in part on the spectral energy, wherein generating the one or more correction factors comprises reducing or substantially eliminating the IQMM component or the LO leakage component of the electromagnetic signal.

2. The electronic device of claim 1, wherein the transceiver comprises a transmitter configured to receive the I/Q signal and to generate the electromagnetic signal.

3. The electronic device of claim 1, wherein the transceiver comprises a receiver configured to receive the feedback signal based on the electromagnetic signal.

4. The electronic device of claim 1, wherein the transceiver is configured to apply the one or more correction factors to the I/Q signal to reduce or substantially eliminate the IQMM component or the LO leakage component of the electromagnetic signal.

5. The electronic device of claim 1, wherein the transceiver is configured to:
 perform a discrete Fourier transform (DFT) of the feedback signal; and
 measure the spectral energy by measuring a spectral energy of the DFT of the feedback signal.

6. The electronic device of claim 5, wherein the transceiver is configured to measure a spectral energy of the DFT as an indication of IQMM component or the local oscillator LO leakage component within the feedback signal.

7. A non-transitory computer-readable medium having computer executable code stored thereon, the code comprising instructions to:
 receive an in-phase/quadrature (I/Q) data signal;
 cause one or more processing devices to generate a radio frequency (RF) transmission signal based on the I/Q data signal;
 receive a sampling signal of the RF transmission signal;
 derive a spectral energy component of an I/Q mismatch component in a frequency domain based on the sampling signal;

downconvert the sampling signal into a zero intermediate frequency (ZIF) signal prior to measuring a spectral energy of the sampling signal, wherein a numerically controlled oscillator (NCO) is configured to generate the ZIF signal in a frequency domain; and cause the one or more processing devices to generate one or more correction signals based at least in part on the spectral energy of the I/Q mismatch component reduce or substantially eliminate the I/Q mismatch component.

8. The non-transitory computer-readable medium of claim 7, wherein the code comprises instructions to derive the spectral energy component of the I/Q mismatch component by causing the one or more processing devices to compute a discrete Fourier transform (DFT) of the sampling signal.

9. The non-transitory computer-readable medium of claim 8, wherein the code comprises instructions to derive the spectral energy component of the I/Q mismatch component by causing the one or more processing devices to measure the spectral energy of the DFT of the sampling signal.

10. The non-transitory computer-readable medium of claim 7, wherein the code comprises instructions to cause the one or more processing devices to adjust the I/Q data signal based on the one or more correction signals.

11. A method, comprising:
receiving a Cartesian representation of a data signal via a transceiver of an electronic device;
generating a radio frequency (RF) signal based on the data signal;
receiving a monitoring signal based on the RF signal;
downconverting the monitoring signal into an intermediate frequency (IF) signal, wherein downconverting the monitoring signal into the IF signal comprises downconverting the monitoring signal into a zero intermediate frequency (ZIF) signal, wherein a numerically controlled oscillator (NCO) is configured to generate the ZIF signal in a frequency domain;
measuring a spectral energy of the of IF signal in a digital domain, wherein the spectral energy comprises an indication of an in-phase/quadrature (I/Q) mismatch component or a local oscillator (LO) leakage component present on the RF signal; and
generating one or more correction factors based at least in part on the spectral energy, wherein the one or more correction factors are generated to remove the I/Q mismatch component or the LO leakage component from the RF signal.

12. The method of claim 11, wherein receiving the Cartesian representation of the data signal comprises receiving a data signal comprising an in-phase (I) component and a quadrature (Q) component.

13. The method of claim 11, wherein measuring the spectral energy of the IF signal comprises measuring the spectral energy of each of a plurality of Fourier coefficients derived based on a Fourier transform of the IF signal.

14. The method of claim 11, comprising:
correcting the RF signal based on the one or more correction factors; and
transmitting the RF signal.

15. An electronic device, comprising:
a network interface configured to allow the electronic device to communicate over one or more channels of a wireless network;
a transmitter configured to transmit in-phase/quadrature (I/Q) signals over the one or more channels; and
a receiver coupled to the transmitter and configured to receive I/Q signals over the one or more channels, wherein the receiver comprises:
one or more processors communicatively coupled to the transmitter and the receiver and configured to:
receive a feedback signal based on I/Q signals to be transmitted by the transmitter, wherein the feedback signal comprises an I/Q distortion, an oscillator distortion, or a combination thereof;
downconvert the feedback signal into a zero intermediate frequency (ZIF) signal prior to detecting a spectral energy of the feedback signal, wherein the receiver comprises a numerically controlled oscillator (NCO) configured to generate the ZIF signal in a frequency domain;
detect the spectral energy of the feedback signal in a frequency domain as indication of a presence of the I/Q distortion, the oscillator distortion, or the combination thereof; and
generate a plurality of error correction factors based at least in part on the spectral energy when present, wherein the plurality of error correction factors are configured to reduce or substantially eliminate the I/Q distortion, the oscillator distortion, or the combination thereof.

16. The electronic device of claim 15, wherein the network interface comprises a personal area network (PAN) interface, a wireless local area network (WLAN) interface, a wide area network (WAN) interface, a broadband fixed wireless access network (WiMAX) interface, a mobile broadband wireless network (mobile WiMAX) interface, an asynchronous digital subscriber line (ADSL) interface, a digital video broadcasting-terrestrial (DVB-T) interface, an ultra wideband (UWB) interface, or any combination thereof.

17. The electronic device of claim 15, wherein the one or more processors are configured to compute a Fourier transform of the feedback signal and to detect the spectral energy by analyzing one or more coefficients of the Fourier transform.

18. The electronic device of claim 15, wherein the one or more processors are configured to provide the plurality of error correction factors to the transmitter to correct the I/Q signals to be transmitted by the transmitter.

* * * * *